United States Patent
Logounov

(10) Patent No.: US 10,259,510 B2
(45) Date of Patent: Apr. 16, 2019

(54) TRUCK SEMITRAILER UNDERBODY AND UNDERCARRIAGE AERODYNAMIC FAIRINGS FOR FUEL ECONOMY

(71) Applicant: Nikolai Logounov, Concord, CA (US)

(72) Inventor: Nikolai Logounov, Concord, CA (US)

(*) Notice: Subject to any disclaimer, the term of this patent is extended or adjusted under 35 U.S.C. 154(b) by 66 days.

(21) Appl. No.: 15/687,461

(22) Filed: Aug. 26, 2017

(65) Prior Publication Data

US 2017/0349224 A1 Dec. 7, 2017

Related U.S. Application Data

(63) Continuation-in-part of application No. 15/066,869, filed on Mar. 10, 2016, now Pat. No. 9,493,197.

(60) Provisional application No. 62/408,071, filed on Oct. 14, 2016.

(51) Int. Cl.
| | |
|---|---|
| *B62D 35/02* | (2006.01) |
| *B62D 35/00* | (2006.01) |
| *B62D 63/08* | (2006.01) |

(52) U.S. Cl.
CPC ......... *B62D 35/001* (2013.01); *B62D 35/007* (2013.01); *B62D 35/008* (2013.01); *B62D 35/02* (2013.01); *B62D 63/08* (2013.01); *B62D 35/005* (2013.01); *Y02T 10/82* (2013.01); *Y02T 10/88* (2013.01)

(58) Field of Classification Search
CPC ...... B62D 35/001; B62D 63/08; B62D 35/02; B62D 35/008; B62D 35/007; B62D 35/005; Y02T 10/82; Y02T 10/88

USPC .......................................... 296/180.4, 180.2
See application file for complete search history.

(56) References Cited

U.S. PATENT DOCUMENTS

| | | | | |
|---|---|---|---|---|
| 4,611,847 A | * | 9/1986 | Sullivan | B62D 35/001 296/180.2 |
| 5,322,340 A | * | 6/1994 | Sato | B62D 25/20 180/68.1 |
| 8,540,304 B2 | * | 9/2013 | Kint | B62D 35/001 296/180.1 |
| 9,079,622 B2 | * | 7/2015 | Gan | B62D 35/001 |
| 9,308,949 B1 | * | 4/2016 | Mihelic | B62D 35/001 |
| 9,409,610 B2 | * | 8/2016 | Baker | B62D 35/001 |
| 2008/0238139 A1 | * | 10/2008 | Cardolle | B62D 35/001 296/180.4 |

(Continued)

*Primary Examiner* — Pinel E Romain
(74) *Attorney, Agent, or Firm* — Main Law Cafe

(57) ABSTRACT

A semitrailer underbody screen and wheel-set fairing kit comprises several panels and fairings for retrofitting on conventional semitrailers. A sectioned panel like fish scales covers the dozens of transverse I-beam cross-members positioned underneath conventional enclosed trailer floors, and carries on down the length of the underbody. A v-hull air deflector is set just beneath these panel covers, ahead of the semitrailer's undercarriage, suspension and tandem rear axle wheels. Such v-hull air deflector splits and aerodynamically "flows" the air being pushed ahead outwards to the sides and around the wheels. The tandem rear axle wheels themselves are completely boxed inside full fenders that cowl over the front, sides, top, and rear. Removable access panels are provided on the outsides of the full fender units for wheel and tire maintenance. The result is significantly less wind drag and noise at highway cruising speeds. Less drag means better fuel economy for the tractor operator.

7 Claims, 6 Drawing Sheets

(56) References Cited

U.S. PATENT DOCUMENTS

| | | | |
|---|---|---|---|
| 2008/0303311 A1* | 12/2008 | Roush | B62D 35/001 296/180.4 |
| 2010/0066123 A1* | 3/2010 | Ortega | B62D 35/001 296/180.4 |
| 2011/0068605 A1* | 3/2011 | Domo | B62D 35/02 296/180.4 |
| 2013/0285411 A1* | 10/2013 | Layfield | B62D 35/02 296/180.4 |
| 2015/0307142 A1* | 10/2015 | Layfield | B62D 35/001 280/476.1 |
| 2017/0217506 A1* | 8/2017 | Bezner | B62D 35/001 |

* cited by examiner

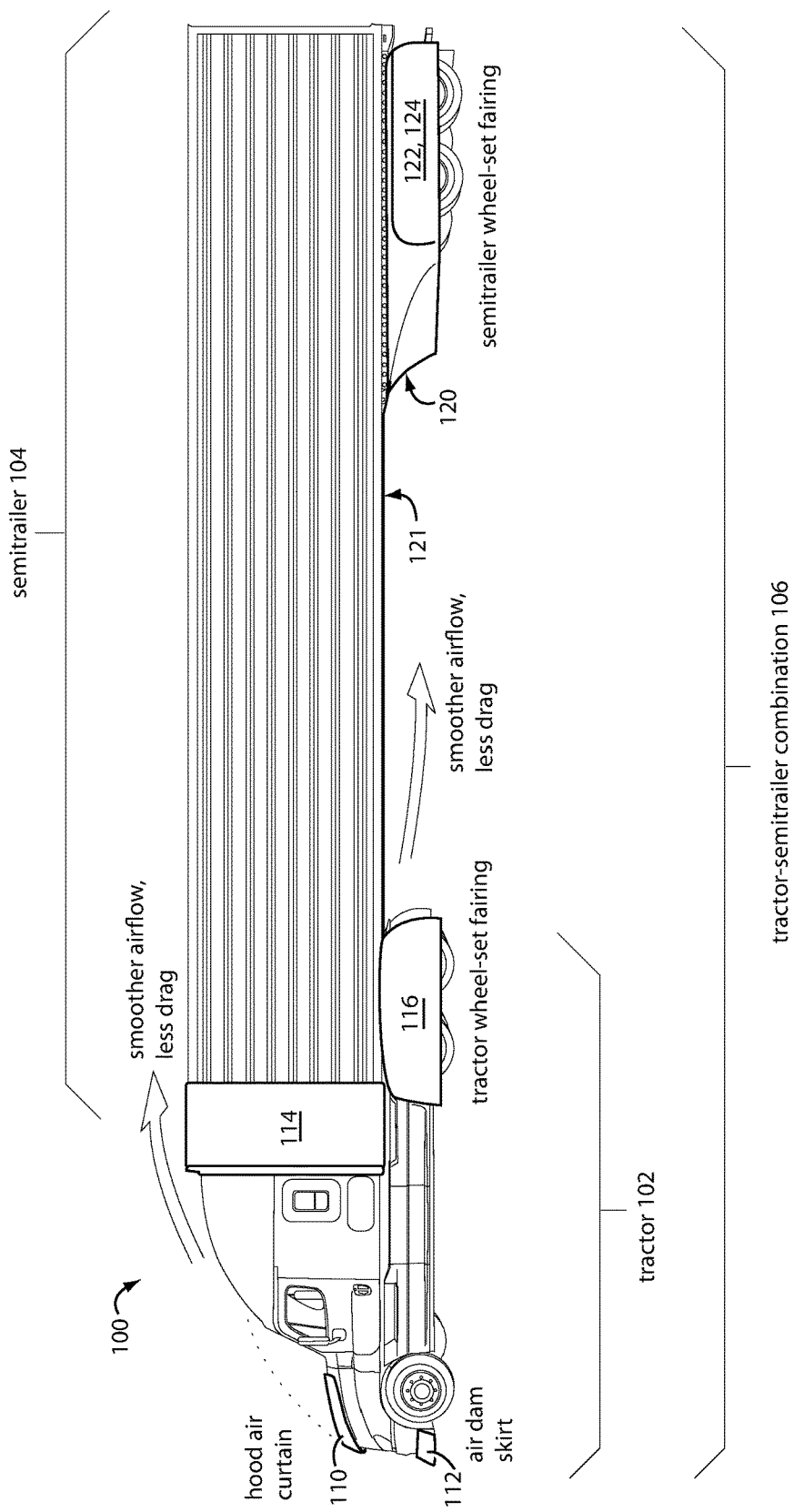

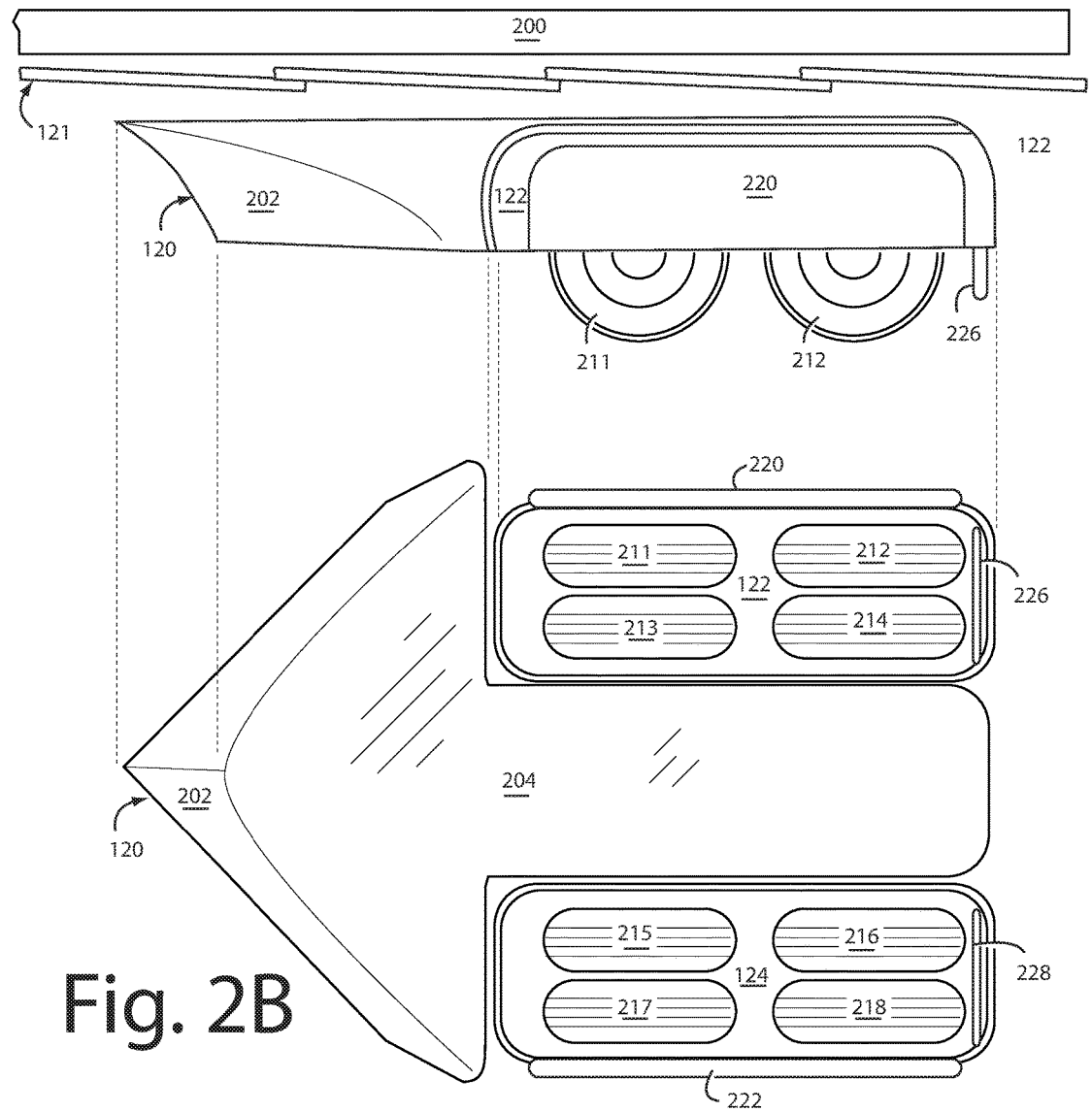

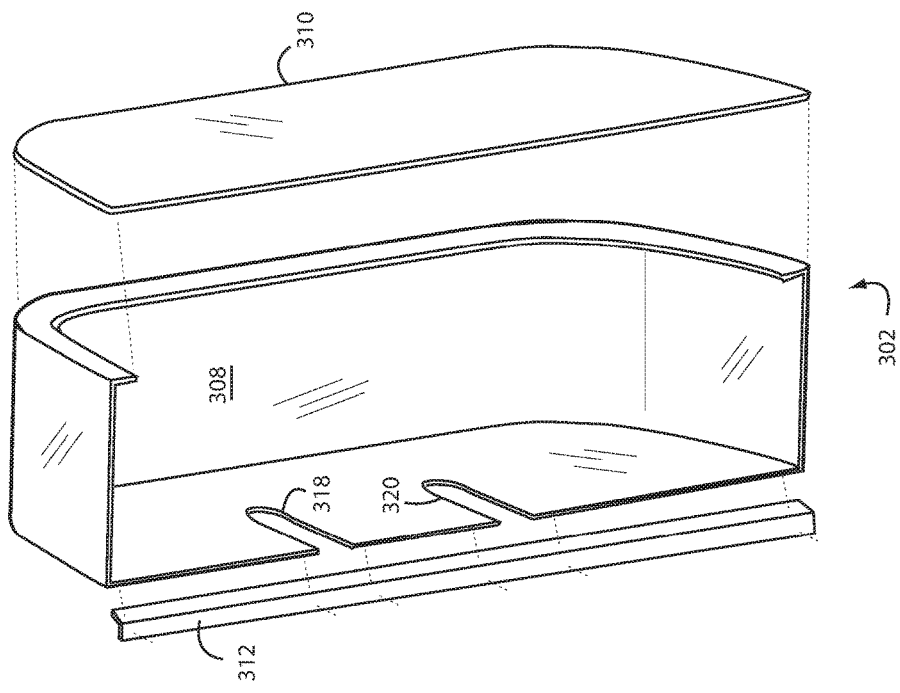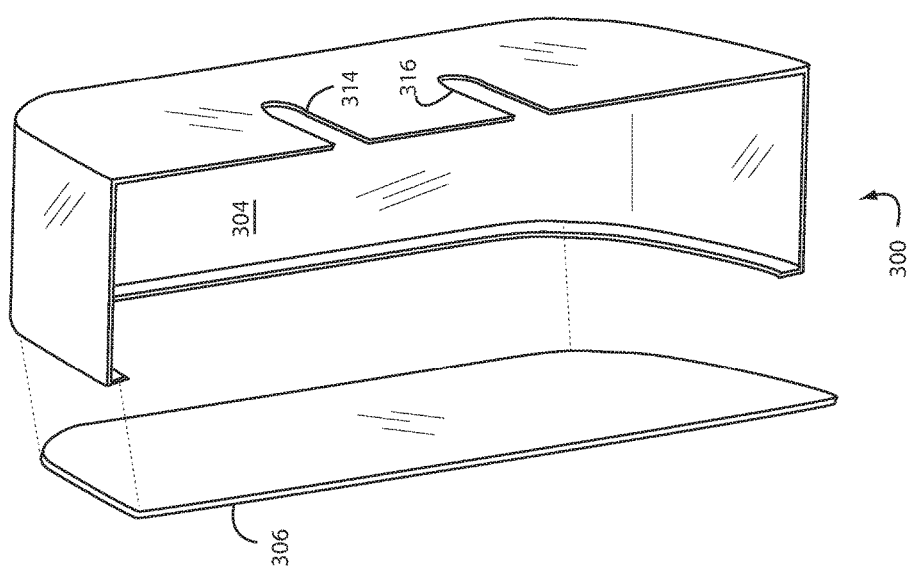

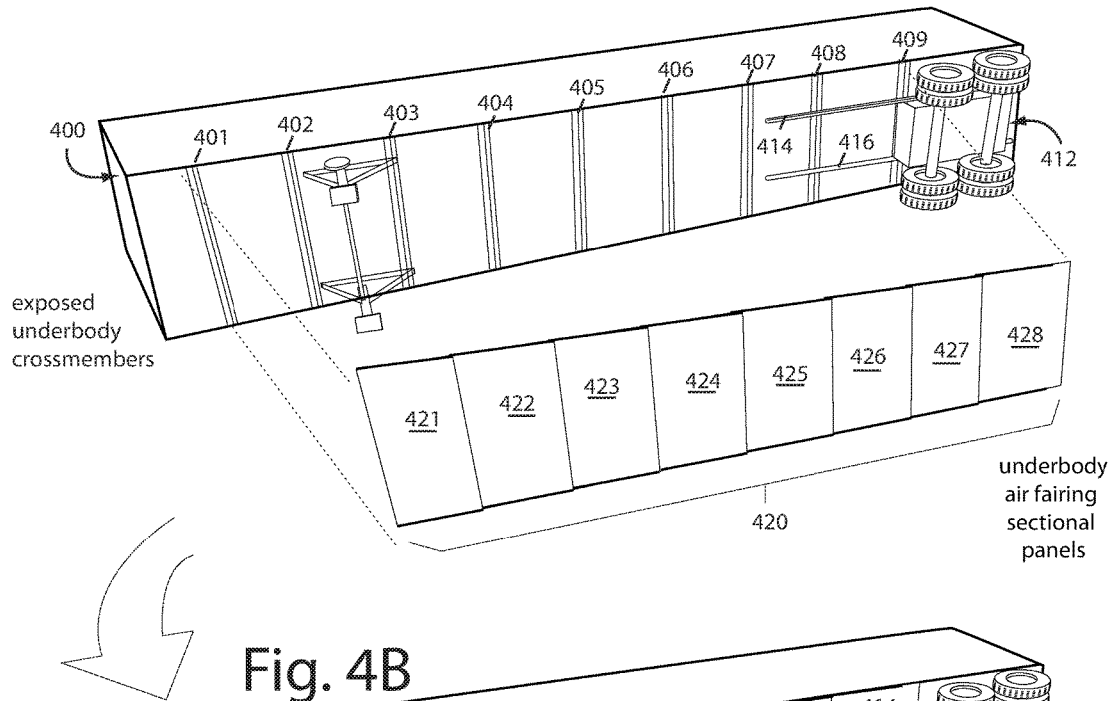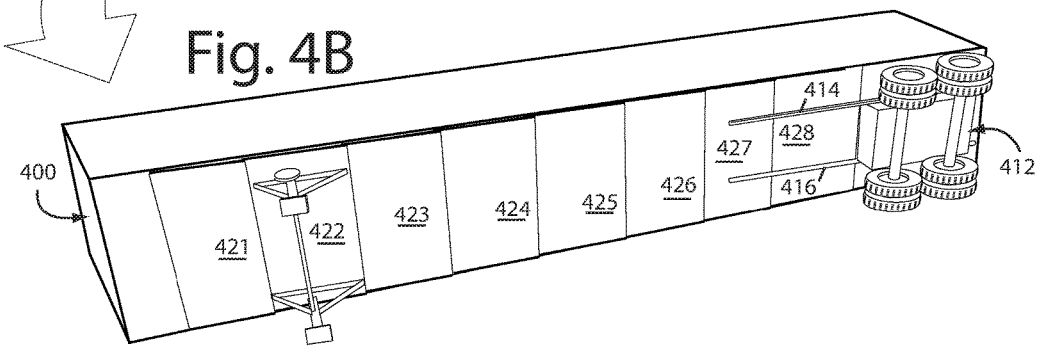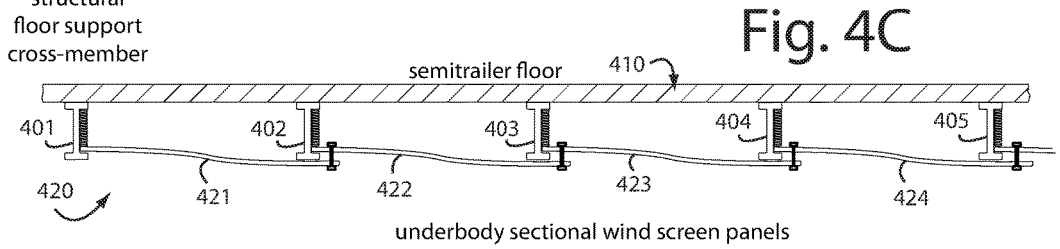

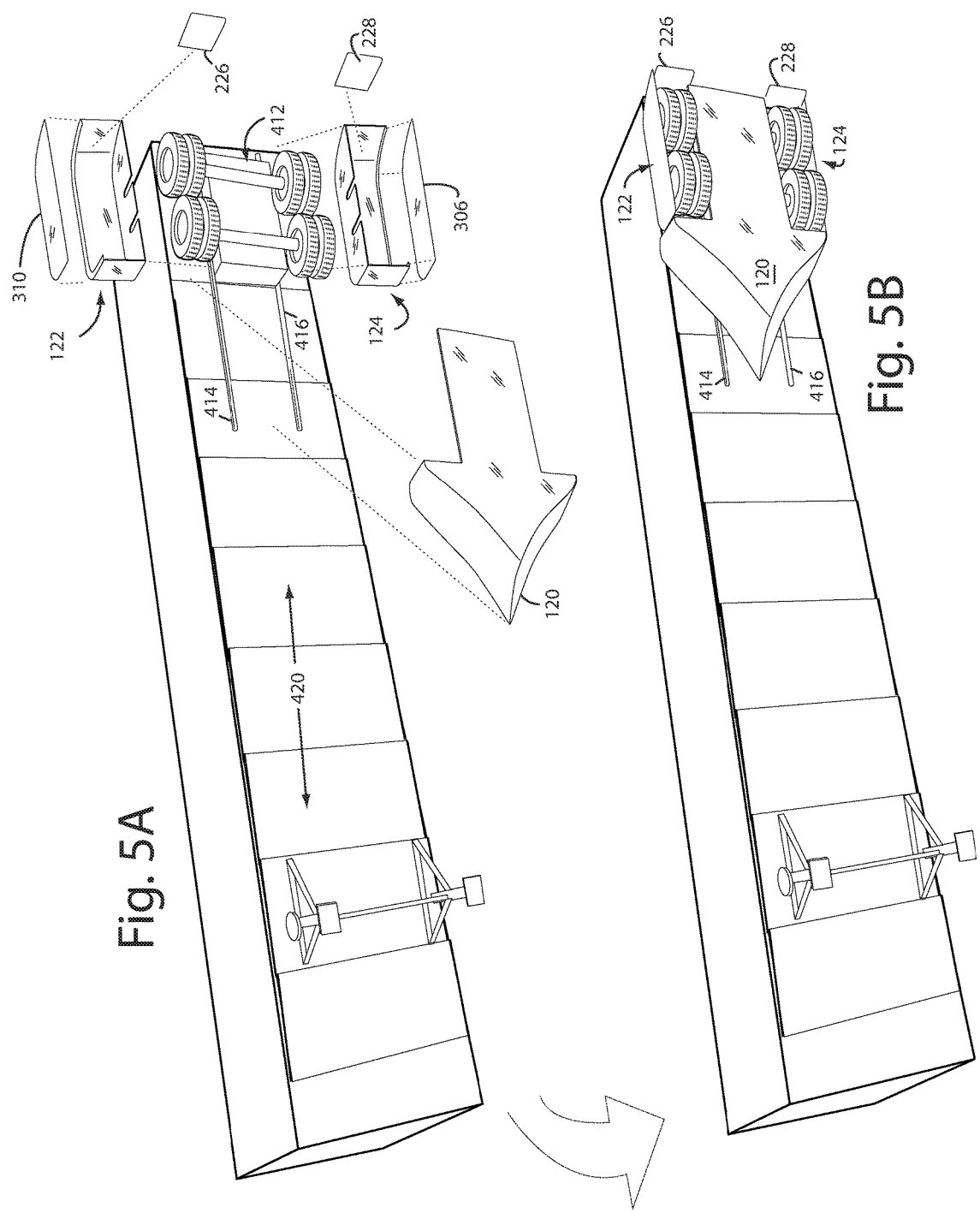

TRUCK SEMITRAILER UNDERBODY AND UNDERCARRIAGE AERODYNAMIC FAIRINGS FOR FUEL ECONOMY

1. FIELD OF THE INVENTION

The present invention relates to methods and devices that improve the operating fuel economy of tractor-semitrailers operated on the highways, and more specifically to practical and lightweight wind fairing panels that aerodynamically eliminate turbulence and air drag common to semitrailers.

2. DESCRIPTION OF THE PRIOR ART

Over 50% of the fuel consumed by heavy commercial vehicles is wasted in overcoming their own aerodynamic drag. Such drag increases with speed as vehicles push themselves though the air ahead. Wasting fuel to overcome drag costs money, and unnecessarily releases more pollutants into our atmosphere. On a national scale, the transportation industry is a top consumer of liquid fuel energy, and therein the second largest source of detrimental greenhouse gases. US-EPA data shows that our heavy-duty trucks and buses account for about a third of the damaging nitrogen oxide emissions, and a quarter of the unsafe particle pollution emissions coming from transportation sources.

It is generally understood that tractor-semitrailer combinations create a lot of wind turbulence and air drag as they move at speed down highways across American highways. Natural Resources Canada (NRC) estimated in 2010 that given 100% of fuel energy, 50% is lost in heat rejection and exhaust heat. Of the 50% left, 42% is lost in braking power, 22.3% in aerodynamic drag, 13.4% in rolling resistance, etc. So the elimination or reduction in aerodynamic drag can result in substantial savings of fuel energy.

Aerodynamic drag cannot be eliminated entirely, but significant fuel savings can be obtained by the careful placement of chassis shields, side extenders, roof fairing panels, wheel covers, and spoilers about both the tractor and semitrailer and the coupling area between them.

A typical commercial truck-tractor in the United States is usually driven an average of about 12,000 miles a month. Driving any less than that usually means the operation will not be profitable. The average fuel economy for semi-trucks is about six miles-per-gallon. Typically, such trucks consume 2,000 gallons of diesel fuel each month. The cost of diesel has been very high lately. The amount of fuel consumed by the entire trucking industry is staggering. By one estimate, there are fifteen million trucks travelling on American highways.

A change is needed in making our use of fuel more efficient.

SUMMARY OF THE INVENTION

Briefly, a semitrailer underbody screen and wheel-set fairing embodiment of the present invention comprises a kit of panels and fairings for retrofitting on conventional semi-trailers. A sectioned underbody panel screen covers the dozens of transverse I-beam cross-members positioned underneath the trailer floor in a series of sections down the length. A v-hull air deflector is set just beneath these panel covers, ahead of the semitrailer's undercarriage, suspension and tandem rear axle wheels. Such v-hull air deflector splits and aerodynamically "flows" the air being pushed ahead outwards to the sides and around the wheels. The tandem rear axle wheels themselves are completely boxed inside full fenders that cowl over the front, sides, top, and rear. Removable access panels are provided on the outsides of the full fender units for wheel and tire maintenance. The result is significantly less wind drag and noise at highway cruising speeds. Less drag means better fuel economy for the tractor operator.

These and other objects and advantages of the present invention will no doubt become obvious to those of ordinary skill in the art after having read the following detailed description of the preferred embodiments and which are illustrated in the various drawing figures.

IN THE DRAWINGS

FIG. 1A is a left side view diagram of a tractor-semitrailer combination showing the placements of several pieces to an embodiment of the present invention for reducing aerodynamic drag;

FIGS. 2A and 2B are left side and bottom view diagrams, respectively, showing more details of the semitrailer v-hull air deflector and left and right full-fender fairings of FIGS. 1A and 1B;

FIGS. 3A and 3B are bottom view perspective diagrams of a pair of semitrailer full-fenders, respectively, of those included in FIGS. 1A, 1B, 2A, and 2B;

FIGS. 4A and 4B are perspective view diagrams of the underside of the semitrailers being fitted with underbody air fairing sectional panels that attach like fish scales to the lateral cross members beneath the flooring;

Figure 1B:
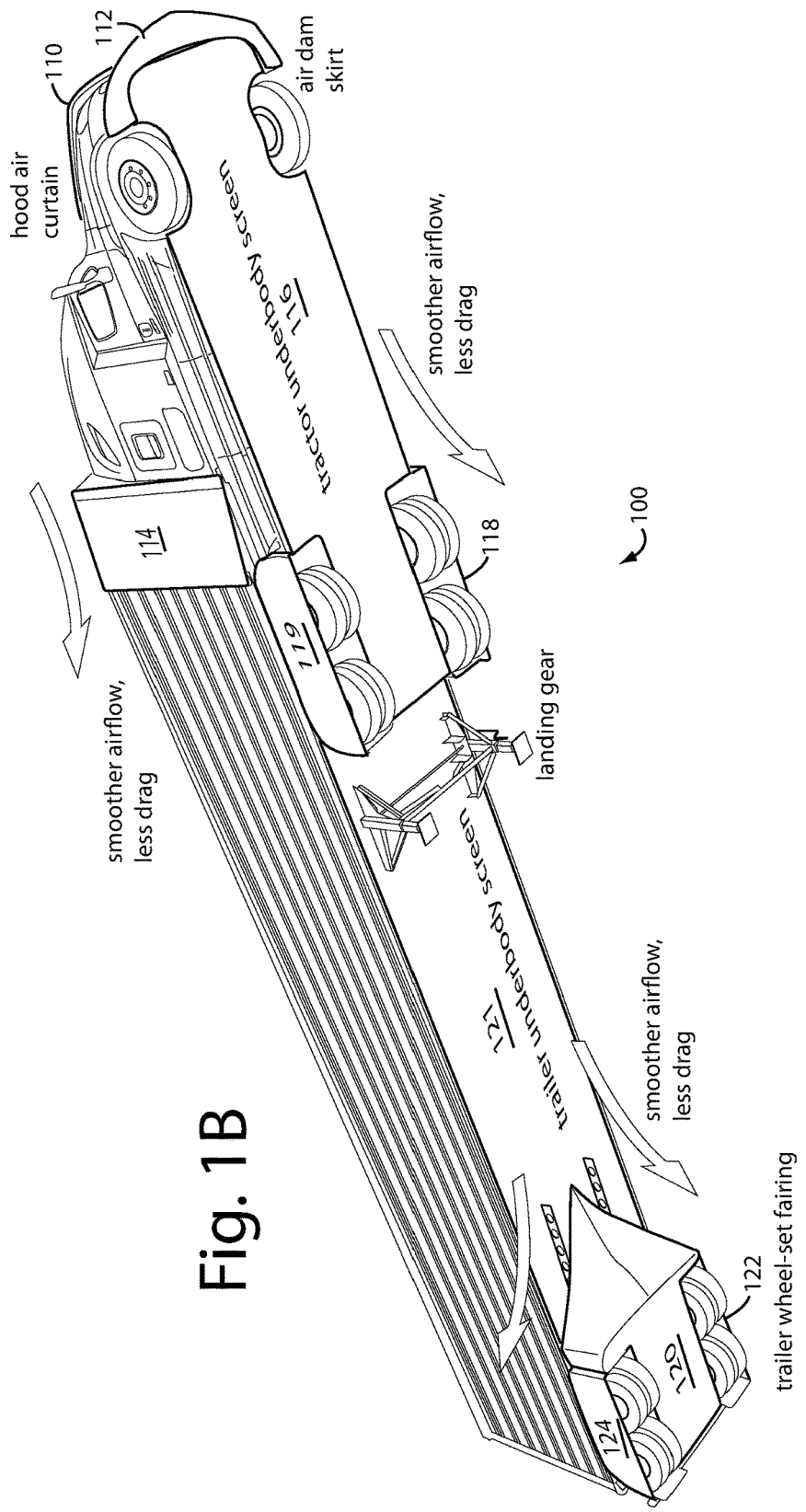
FIG. 1B is a perspective view diagram looking up underneath the tractor-semitrailer combination of FIG. 1A and showing further details of the construction and installation of an embodiment of the present invention for reducing aerodynamic drag.

FIG. 4C is a side view diagram of the underbody air fairing sectional panels attached like fish scales to the I-beams used as cross members to support the semitrailer floor; and FIGS. 5A and 5B are before and after perspective view diagrams of the underside of the semitrailer of FIGS. 4A-4C being fitted with a v-hull air deflector and a pair of full fenders, all in one embodiment of the present invention.

DETAILED DESCRIPTION OF THE PREFERRED EMBODIMENT

FIGS. 1A and 1B represent a conventional tractor-semitrailer combination fitted with a fuel economy system embodiment of the present invention, and is referred to by the general reference numeral 100. The fuel economy system 100 has several independent constituent parts that can each be used as standalone kits to improve the fuel economy of a tractor-semitrailer operating at highway speeds. Together, in combination or separately, these kits provide truck operators and transportation businesses a significant way to improve their fuel economy.

FIGS. 1A and 1B show a typical American tractor 102 coupled with a "fifth-wheel" to a representative American semitrailer 104, e.g., in a tractor-semitrailer combination 106. Millions of such tractor-semitrailer combinations 106 are operated everyday on United States highways, and elsewhere.

My fuel economy system 100 can be manufactured, sold, and installed in several stages, using kits, all of which reduce wind drag and noise from air turbulence at highway speeds. A first kit is a hood air curtain 110 that actively pumps an airflow up over the hood and windshield of the tractor 102, e.g., to lift airflows up and over the top in a smooth laminar stream. A second kit is an air dam shield 112 mounted below and in front of the front bumper to push ground air on the highway smoothly to the sides and around.

A third kit has already been patented by me, an aerodynamic wind fairing 114 that bridges the gap between the tractor 102 and its semitrailer 104. I was issued U.S. Pat. No. 9,493,197, for it on Nov. 15, 2016.

A fourth kit includes the tractor underbody and wheel-set fairing. Such kit comprises a flat panel screen 116 that covers the entire underbody and drive wheel suspension of tractor 102, and full-fenders 118 and 119 that completely box-in the left and right tandem drive wheels inside, outside, on top, in front, and in back. The aft section of flat panel screen 116 between full-fenders 118 and 119 passes just below the axles and is supported along its aft perimeters by the inner pieces of full-fenders 118 and 119. The forward section of flat panel screen 116 between the front steerable wheels passes just below the axles and is supported along its perimeters by the tractor's inner front fenders and rocker panels on the two sides.

In many of the more popular semitrailers in operation in the United States, the entire rear wheel undercarriage and suspension is constructed as a single unit in a slider module that can be positioned at various points along two parallel underbody slider rails. This type of construction then necessitates that any fenders or fairing we add around the wheels to the semitrailer be mounted to the slider module to reposition with it at those various points.

A fifth kit, which is the focus of this Application and its Claims, includes a flat semitrailer underbody panel a flared v-hull air deflector 120 with a prow, wind screen 121, and left and right wheel-set fairings as full fenders 122 and 124. In one embodiment, the underbody panel wind screen 121 comprises several rectangular sections interlocked in series together like fish scales to cover the dozens of transverse I-beam cross-members positioned underneath conventional enclosed trailer floors. The underbody panel wind screen 121 carries on down the length and between the undercarriage and the semitrailer underbody.

FIGS. 2A and 2B represent more of the details of the flared v-hull air deflector 120, and left and right full-fender fairings 122 and 124, of FIGS. 1A and 1B. A floor 200 of semitrailer 104 is conventionally supported by a sliding undercarriage that needs to be fully shielded in order to control airflows and thereby reduce aerodynamic drag around the wheels and suspension. The flared v-hull air deflector 120 includes a pointed prow 202 and a flat bottom 204. Eight wheels and tires 211-218 are organized into double wheels on tandem axles. The flat bottom 204 is carried aft just under their axles.

Here, full-fender fairing 122 completely boxes in and surrounds wheels 211-214. Similarly, full-fender fairing 124 completely boxes in and surrounds wheels 215-218. The v-hull air deflector 120 flares wide enough on both sides to fully shield the fronts of full-fender fairings 122 and 124. Each have a removable side panel 220 and 222, and mud-flap 226 and 228.

FIGS. 3A and 3B illustrate full-fender fairings 300 and 202, as could be used on the semitrailers in FIGS. 1A, 1B, 2A, and 2B. These completely box in and surround a semitrailer's eight wheels on two axles. A right main fender 304 provides wheel maintenance access with a removal right panel 306. A left main fender 308 provides wheel maintenance access with a removal left panel 310. These main fenders mount by their tops to the undercarriage, and provide mounting for the aft sections of the v-hull air deflector along their inner bottom and front bottom edges. For example, an angle bracket 312 would be useful for this attachment.

Each main fender 304 and 308 are provided with a pair of axle slots 314, 316, and 318, 320. These slots are necessary to allow the two wheel axles to move up and down on their respective undercarriage suspensions.

FIGS. 4A, 4B, and 4C represent a semitrailer 400 laid on its right side for illustration purposes only here. Underneath, a series of transverse, parallel, aluminum I-beam cross-members 401-409 provide structural support for a semitrailer floor 410.

Conventional enclosed semitrailers 400 commonly include a sliding undercarriages 412 that can be adjusted fore and aft on a pair of undercarriage sliding rails 414 and 416. Such allows the rear wheels to be positioned best for the load being carried by the semitrailer 400. The pair of undercarriage sliding rails 414 and 416 are themselves structurally supported by several of the I-beam cross-members 401-409.

Open and exposed, the cross-members 401-409 can catch a lot of wind and turbulence, and are a major cause of aerodynamic drag for semitrailer 400. A underbody panel wind screen 420 is therefore used to cover many large protrusions and irregularities, and thereby promote a laminar air flow underneath semitrailer 400. In one embodiment of wind screen 420, several rectangular panels 421-428 are interlocked together onto the cross members 401-409 like fish scales. FIG. 4C shows this construction in better detail. Springs, fasteners and clips can be used to secure together the various constituent pieces of underbody panel wind screen 420.

It will often be necessary for the sliding undercarriage 412 to be moved and repositioned independently over the underbody panel wind screen 420. Therefore, the v-hull air deflector 120, and left and right wheel-set fairings (full fenders) 124 and 126 must be mounted to the sliding undercarriage so they can always maintain their relative positions with the wheels and suspension.

The retrofitting of a semitrailer underbody and wheel-set fairing combination of a pointed, flat-bottom v-hull 120, a flat underbody screen 121, a left-side trailer wheel-set cowl 122, and right-side trailer wheel-set cowl 124 makes a tractor-semitrailer 106 more aerodynamic, reduces air drag, and yields fuel savings at highway speeds.

FIGS. 5A and 5B represent the final assembly in one embodiment of the present invention. The underside of semitrailer 400 (FIGS. 4A-4C) is dressed with a flared v-hull air deflector and a pair of full fenders, all.

In general, semitrailer underbody wheel-set fairing embodiments of the present invention comprise a single full fairing that aerodynamically "flows" around the whole of a semitrailer's rear tandem axle set. The kit includes brackets to attach molded fairings to a rear semitrailer underside. The fairings have a boat-like bow to induce a laminar airflow to split and stream smoothly around both sides of the semitrailer's rear tandem wheel set. The result is significantly less wind drag and noise at highway cruising speeds. Less drag means better fuel economy for the tractor operator. Easy maintenance access to the wheels and undercarriage are provided by simple-to-remove panels.

A flat underbody screen 105A is needed wherever the underbody of semitrailer 108 is cluttered or otherwise irregular, and prevents a smooth laminar flow of highway ground air beneath the semitrailer 108. Particular semitrailers from some manufacturers many already have smooth flat bottoms. The typical flat underbody screen 105A is a rectangular sheet of 0.25" ABS, and cut the full width and length of the underside of the semitrailer, or as much as possible. Alternatively, it can be framed and sectioned into a single queue of full-width rectangular panels that interlock like fish scales with transverse cross-members and clips to gain access behind each panel section. The flat underbody screen 105A is best positioned beneath, or inlet around the mounting bases of the landing gear and tandem axles.

The pointed, flat-bottom v-hull 105B is preferably fabricated of molded ABS, or fiberglass and epoxy resin a supporting frame. A v-hull, symmetrically flared bow area points forward ahead of a centerline between the semitrailers tandem rear wheels. The flat-bottom v-hull 105B continues with a flat bottom notched in between for the dual left-side and right-side wheels. The bow area flares wide enough to fully span the entire width of the tandem axles and wheels. This then directs most of the highway road air flowing underbody of the semitrailer out and away to either side.

In general, embodiments of the present invention can be prepared as original equipped or as an after-market semitrailer aerodynamics improvement kit. Each comprising a left-side full-fender fairing that fully shields in one assembly the top, front, back, inside and outside all the wheels on the left rear of a tractor semitrailer; a right-side full-fender fairing that fully skits in one assembly the top, front, back, inside and outside all the wheels on the right rear of the tractor semitrailer; and a forward pointing flared v-hull that mounts to and closes in both the fronts and inside portions of the left-side and right-side boxes to smoothly deflect airflows around all of the rear wheels of the tractor semitrailer.

As such, the left-side full-fender fairing, right-side full-fender fairing, and forward pointing flared v-hull are all bolted to one another and mounted together to a sliding undercarriage that in turn fixes to two parallel semitrailer underbody slider rails at a choice of positions fore and aft. Together these improve the highway speed aerodynamics of the semitrailer by reducing drag and thereby reduce the fuel costs to haul any semitrailer so equipped.

The semitrailer aerodynamics improvement kit may further comprise a number of overlapping flat panel fairings that join in series like fish scales, and that interlock with a corresponding number of transverse parallel cross members supporting a floor of the tractor semitrailer. Otherwise, air pockets would be left exposed. The semitrailer aerodynamics improvement may also include a pair of wheel-access removable panels, one each mounted to the outside walls of the left-side full-fender fairing and right-side full-fender fairing, and that provide wheel-access for maintenance.

Such semitrailer aerodynamics improvement kit, and especially the forward pointing flared v-hull, has a prow disposed just ahead of the undercarriage of the semitrailer, and that functions to split and aerodynamically flow an air mass ahead to be pushed outwards to the sides and around the wheels. The result is significantly less wind drag and noise at highway cruising speeds. Less drag means better fuel economy for the tractor operator.

A method embodiment of the present invention improves the aerodynamics of a semitrailer. This results in the semitrailer requiring less work from any truck tractor hauling it at highway speeds. That then improves the fuel economy of operating the truck tractor. The steps of the Method include reducing the undercarriage aerodynamic drag around the rear wheels of a tractor semitrailer by fitting to its undercarriage a left-side full-fender fairing that, in one assembly, fully shields the top, front, back, inside and outside of all the wheels on the left rear of the tractor semitrailer, a right-side full-fender fairing that, in one assembly, fully shields the top, front, back, inside and outside of all the wheels on the right rear of the tractor semitrailer, and a forward pointing flared v-hull that mounts to and closes in both the fronts and inside portions of the left-side and right-side boxes to smoothly deflect airflows around all of the rear wheels of the tractor semitrailer.

It is important to maintain a fixed relationship between the rear wheels of the tractor semitrailer, and the left-side and right-side full fender boxes and flared v-hull as an assembled unit. The assembled unit is fixed to the undercarriage such that is free to slide and lock at different positions. The method further reduces the underbody aerodynamic drag of the tractor semitrailer by fitting to its underbody overlapping fairings like fish scales interlocked with a number of transverse parallel cross members supporting a floor of the tractor semitrailer and that would otherwise be left exposed.

Although the present invention has been described in terms of the presently preferred embodiments, it is to be understood that the disclosure is not to be interpreted as limiting. Various alterations and modifications no doubt become apparent to those skilled in the art after having read the above disclosure. Accordingly, it is intended that the appended claims be interpreted as covering all alterations and modifications as fall within the "true" spirit and scope of the invention.

What is claimed is:

1. A semitrailer aerodynamics improvement kit, comprising:
    a left-side full-fender fairing that fully skirts-in together in a first box assembly a top, front, back, inside and outside walls of a left-side group of rear wheels under a tractor semitrailer;
    a right-side full-fender fairing that fully skirts-in together in a second box assembly a top, front, back, inside and outside walls of a right-side group of rear wheels under the tractor semitrailer; and
    a forward pointing flared v-hull that mounts between and to the first and second box assemblies such that it closes in both the fronts and inside portions of the left-side and right-side to smoothly deflect airflows around the rear wheels and under the tractor semitrailer;
    wherein, the left-side full-fender fairing, right-side full-fender fairing, and forward pointing flared v-hull are all bolted to one another and mounted together to a sliding undercarriage that in turn fixes to a pair of two parallel semitrailer underbody slider rails at a choice of positions fore and aft; and
    wherein such together in combination reduce an inherent aerodynamic drag and any associated fuel costs to haul any semitrailer so equipped.

2. The semitrailer aerodynamics improvement kit of claim 1, further comprising:
    a number of overlapping flat panel fairings joinable together in series like fish scales, and configured to interlock with a corresponding number of transverse parallel cross members supporting a floor of the tractor semitrailer that would otherwise leave air pockets exposed.

3. The semitrailer aerodynamics improvement kit of claim 1, further comprising:
    a pair of wheel-access removable panels, one each mounted to the outside walls of the left-side full-fender fairing and right-side full-fender fairing, wherein is provided access for wheel maintenance.

4. The semitrailer aerodynamics improvement kit of claim 1, wherein:

the forward pointing flared v-hull has a prow disposed just ahead of a rear wheel undercarriage of the tractor semitrailer, and that functions to split and aerodynamically flow an air mass ahead outwards.

5. A method of improving the aerodynamics of a tractor semitrailer that results in the tractor semitrailer requiring less work from any truck tractor hauling it at highway speeds, and thus improves fuel economy, comprising:

reducing an inherent aerodynamic drag around an undercarriage and rear wheels of a tractor semitrailer by:

aerodynamically shielding and enclosing above, in front, in back, inside and outside of all left-side rear wheels of the tractor semitrailer by attaching and fitting a left-side full-fender fairing in one assembly;

aerodynamically shielding and enclosing above, in front, in back, inside and outside of all right-side rear wheels of the tractor semitrailer by attaching and fitting a right-side full-fender fairing in one assembly; and mounting a forward pointing flared v-hull to close in both a front and an inside of the left-side and right-side full-fender fairings such that airflows can smoothly deflect airflows around all rear wheels of the tractor semitrailer.

6. The method of claim 5, further comprising:

maintaining a fixed relationship between all rear wheels of the tractor semitrailer, and both the left-side and right-side full fender boxes and the flared v-hull in an assembled unit, and fixing the assembled unit to the undercarriage such that is enabled to slide and lock at different positions fore and aft.

7. The method of claim 5, further comprising:

reducing any inherent underbody aerodynamic drag of the tractor semitrailer by fitting overlapping fairings like fish scales interlocked with a number of transverse parallel cross members underbody supporting a floor of the tractor semitrailer that would otherwise be left exposed.

* * * * *